(12) United States Patent
Xu et al.

(10) Patent No.: US 9,986,593 B2
(45) Date of Patent: May 29, 2018

(54) METHOD AND APPARATUS FOR HANDLING DUPLICATED E-RABS FOR DUAL CONNECTIVITY IN WIRELESS COMMUNICATION SYSTEM

(71) Applicant: LG ELECTRONICS INC., Seoul (KR)

(72) Inventors: Jian Xu, Seoul (KR); Daewook Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 265 days.

(21) Appl. No.: 14/877,662

(22) Filed: Oct. 7, 2015

(65) Prior Publication Data

US 2016/0105928 A1    Apr. 14, 2016

Related U.S. Application Data

(60) Provisional application No. 62/061,676, filed on Oct. 8, 2014.

(51) Int. Cl.

| | |
|---|---|
| *G01R 31/08* | (2006.01) |
| *H04L 5/14* | (2006.01) |
| *H04B 7/00* | (2006.01) |
| *H04J 3/00* | (2006.01) |
| *H04W 76/06* | (2009.01) |
| *H04W 72/04* | (2009.01) |
| *H04L 5/00* | (2006.01) |
| *H04W 88/08* | (2009.01) |
| *H04W 76/02* | (2009.01) |

(52) U.S. Cl.
CPC ......... *H04W 76/064* (2013.01); *H04L 5/0098* (2013.01); *H04W 72/048* (2013.01); *H04W 76/021* (2013.01); *H04W 88/08* (2013.01)

(58) Field of Classification Search
CPC .. H04W 76/064; H04W 72/048; H04L 5/0098
See application file for complete search history.

(56) References Cited

U.S. PATENT DOCUMENTS

| | | | | |
|---|---|---|---|---|
| 2011/0002304 A1* | 1/2011 | Lee | ........................ | H04W 36/02 370/331 |
| 2014/0135007 A1* | 5/2014 | Yu | ......................... | H04W 36/00 455/436 |
| 2014/0204794 A1* | 7/2014 | El-Najjar | .............. | H04W 16/18 370/254 |

(Continued)

OTHER PUBLICATIONS

3GPP TSG-RAN WG3 Meeting #85bis (R3-142390).*
(Continued)

*Primary Examiner* — Brian Roberts
*Assistant Examiner* — Abu-Sayeed Haque
(74) *Attorney, Agent, or Firm* — Birch, Stewart, Kolasch & Birch, LLP

(57) ABSTRACT

A method and apparatus for handling duplicated evolved universal terrestrial radio access network (E-UTRAN) radio access bearers (E-RABs) for dual connectivity in a wireless communication system is provided. A mobility management entity (MME) receives an E-RAB modification indication message including several E-RAB identifiers (IDs) set to the same value, and triggers a user equipment (UE) context release procedure with a cause value.

15 Claims, 15 Drawing Sheets

(56) References Cited

U.S. PATENT DOCUMENTS

| | | | | |
|---|---|---|---|---|
| 2014/0241317 A1* | 8/2014 | Jamadagni | .......... | H04W 76/025 370/331 |
| 2015/0045052 A1* | 2/2015 | Pao | ...................... | H04W 88/06 455/453 |
| 2016/0065644 A1* | 3/2016 | Kant | ...................... | H04L 67/02 709/203 |
| 2016/0164732 A1* | 6/2016 | Suerbaum | ........... | H04L 41/0816 370/328 |
| 2016/0353511 A1* | 12/2016 | Gunnarsson | ........ | H04W 76/028 |

OTHER PUBLICATIONS

Huawei, "Discussion on E-RAB Modification Indication procedure," 3GPP TSG RAN WG3 Meeting #85, R3-141610, Dresden Germany, Aug. 18-22, 2014, 4 pages.

LG Electronics Inc., "Consideration on open issues for Path Switch," 3GPP TSG-RAN WG3 Meeting #85bis, R3-142390, Shanghai, China, Oct. 6-10, 2014, pp. 1-6.

LG Electronics Inc., "Discussion on Path Switch Failure," 3GPP TSG-RAN WG3 Meeting # 85, R3-141844, Dresden, Germany, Aug. 18-22, 2014, pp. 1-3.

LG Electronics Inc., "Stage 2 TP for Path Switch," 3GPP TSG-RAN WG3 Meeting #85bis, R3-142391, Shanghai, China, Oct. 6-10, 2014, pp. 1-2.

LG Electronics Inc., "Stage 3 TP for Path Switch," 3GPP TSG-RAN WG3 Meeting #85bis, R3-142392, Oct. 6-10, 2014, 11 pages.

* cited by examiner

METHOD AND APPARATUS FOR HANDLING DUPLICATED E-RABS FOR DUAL CONNECTIVITY IN WIRELESS COMMUNICATION SYSTEM

CROSS-REFERENCE TO RELATED APPLICATIONS

This application claims the benefit of priority of U.S. Provisional application No. 62/061,676 filed on Oct. 8, 2014, which is incorporated by reference in its entirety herein.

BACKGROUND OF THE INVENTION

Field of the Invention

The present invention relates to wireless communications, and more particularly, to a method and apparatus for handling duplicated evolved universal terrestrial radio access network (E-UTRAN) radio access bearers (E-RABs) reporting for dual connectivity in a wireless communication system.

Related Art

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Small cells using low power nodes are considered promising to cope with mobile traffic explosion, especially for hotspot deployments in indoor and outdoor scenarios. A low-power node generally means a node whose transmission power is lower than macro node and base station (BS) classes, for example pico and femto evolved NodeB (eNB) are both applicable. Small cell enhancements for evolved UMTS terrestrial radio access (E-UTRA) and evolved UMTS terrestrial radio access network (E-UTRAN) will focus on additional functionalities for enhanced performance in hotspot areas for indoor and outdoor using low power nodes.

One of potential solutions for small cell enhancement, dual connectivity has been discussed. Dual connectivity is used to refer to operation where a given UE consumes radio resources provided by at least two different network points connected with non-ideal backhaul. Furthermore, each eNB involved in dual connectivity for a UE may assume different roles. Those roles do not necessarily depend on the eNB's power class and can vary among UEs. Dual connectivity may be one of potential solutions for small cell enhancement.

A secondary eNB (SeNB) may be added or modified for dual connectivity. Further, evolved universal terrestrial radio access network (E-UTRAN) radio access bearers (E-RABs) may need to be modified during the SeNB addition or modification procedure. However, some abnormal cases may occur during E-RAB modification indication, and a method for handling the abnormal cases may be required.

SUMMARY OF THE INVENTION

The present invention provides a method and apparatus for handling duplicated evolved universal terrestrial radio access network (E-UTRAN) radio access bearers (E-RABs) reporting for dual connectivity in a wireless communication system. The present invention provides a method and apparatus for triggering a user equipment (UE) context release procedure when several E-RAB identifiers (IDs) are set to the same value.

In an aspect, a method for handling, by a mobility management entity (MME), duplicated evolved universal terrestrial radio access network (E-UTRAN) radio access bearers (E-RABs) for dual connectivity in a wireless communication system is provided. The method includes receiving an E-RAB modification indication message including several E-RAB identifiers (IDs) set to the same value, and triggering a user equipment (UE) context release procedure with a cause value.

In another aspect, a mobility management entity (MME) includes a memory, a transceiver, and a processor coupled to the memory and the transceiver, and configured to control the transceiver to receive an evolved universal terrestrial radio access network (E-UTRAN) radio access bearer (E-RAB) modification indication message including several E-RAB identifiers (IDs) set to the same value, and trigger a user equipment (UE) context release procedure with a cause value.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
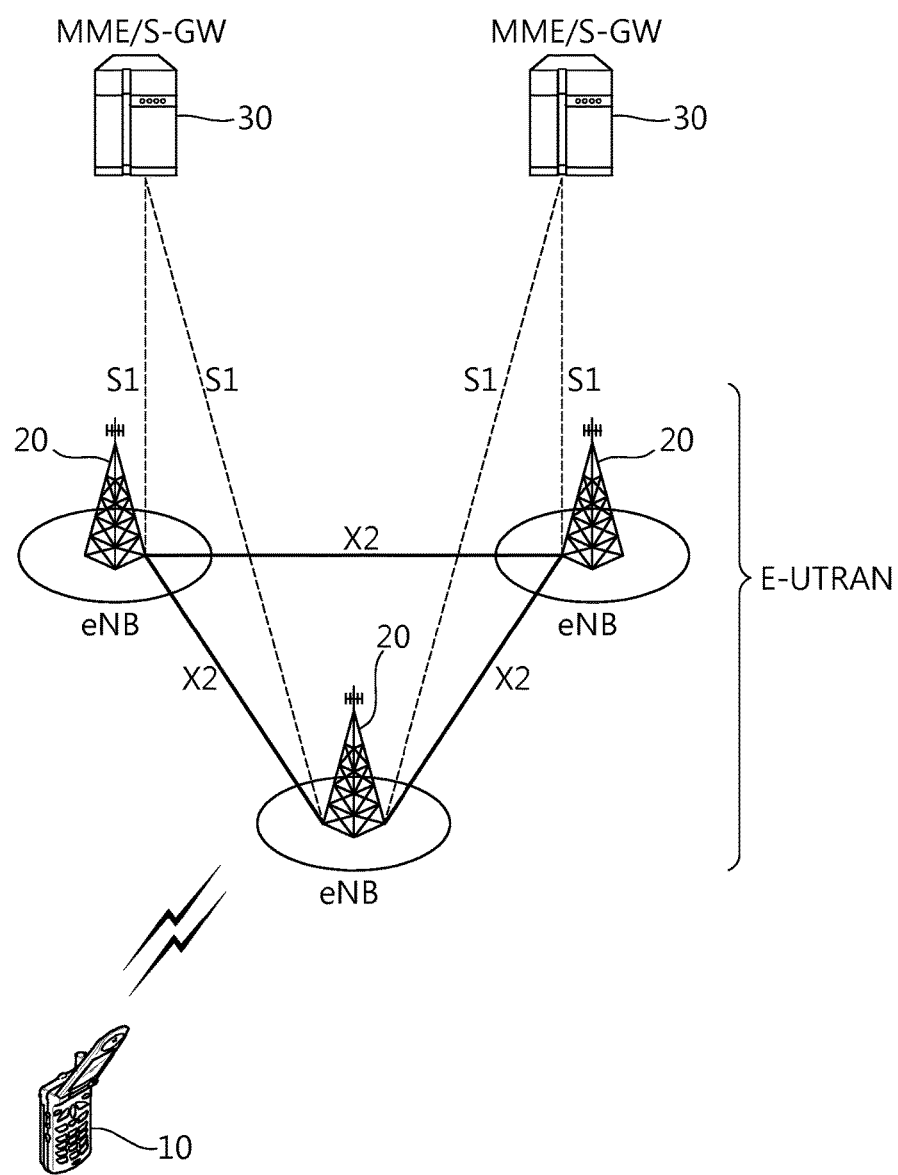
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a system architecture evolution (SAE) gateway (S-GW). The MME/S-GW 30 may be positioned at the end of the network and connected to an external network. For clarity, MME/S-GW 30 will be referred to herein simply as a "gateway," but it is understood that this entity includes both the MME and S-GW.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

Figure 2:
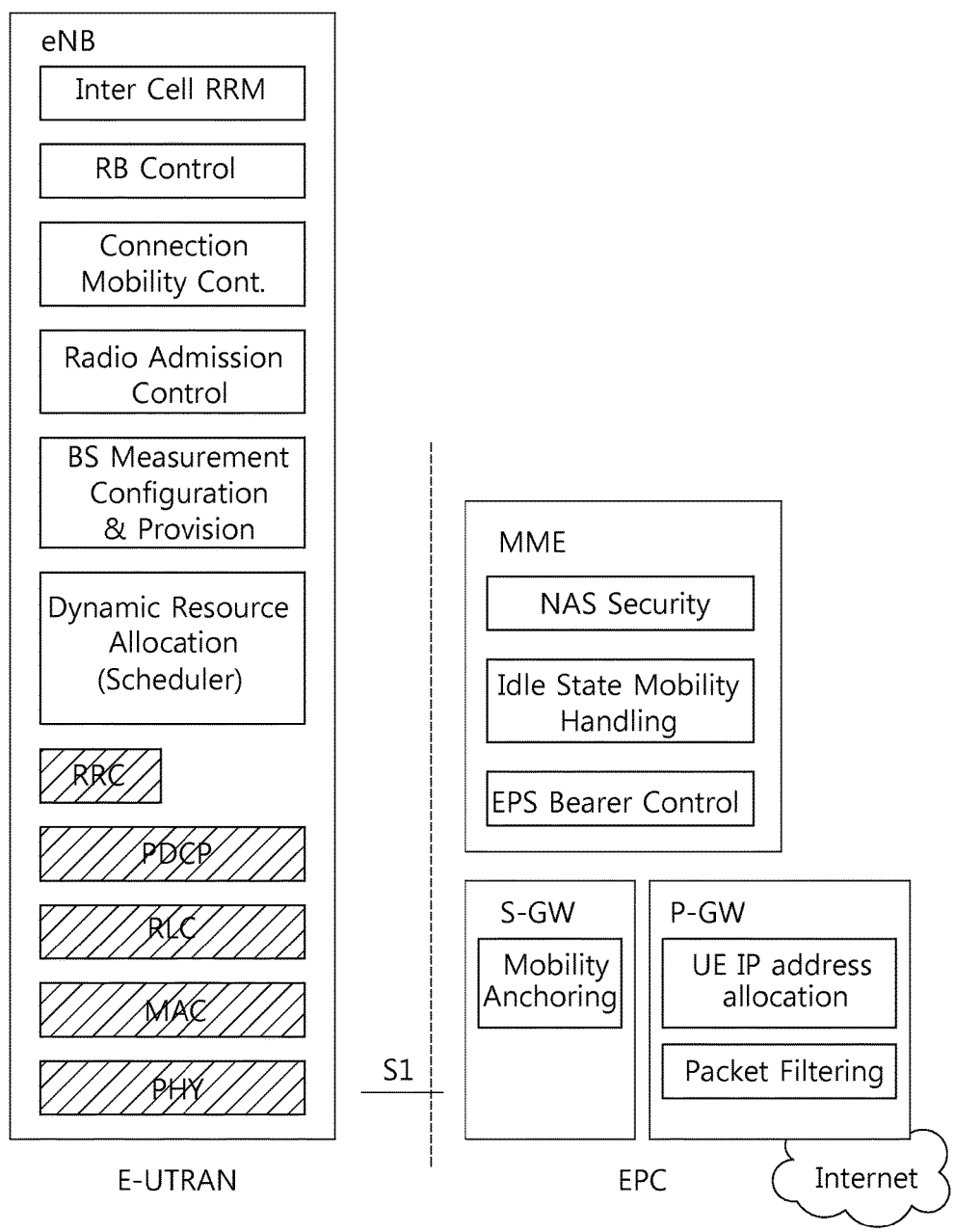
FIG. 2 shows a block diagram of architecture of a typical E-UTRAN and a typical EPC.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 3:
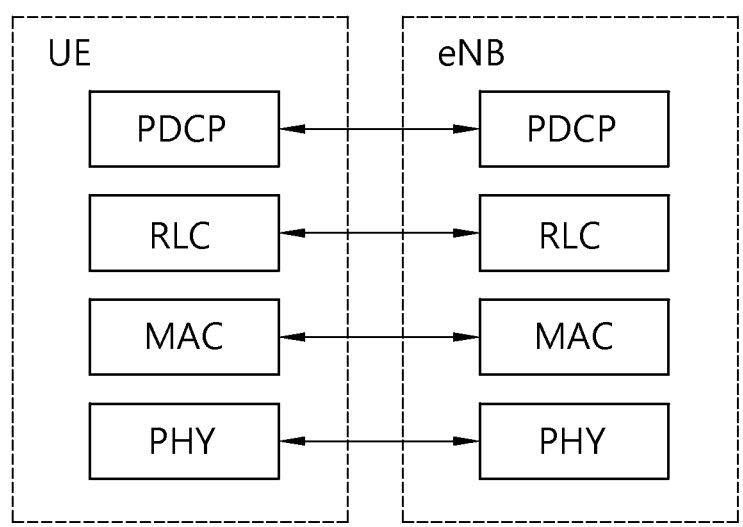
FIG. 3 shows a block diagram of a user plane protocol stack of an LTE system.
Figure 4:
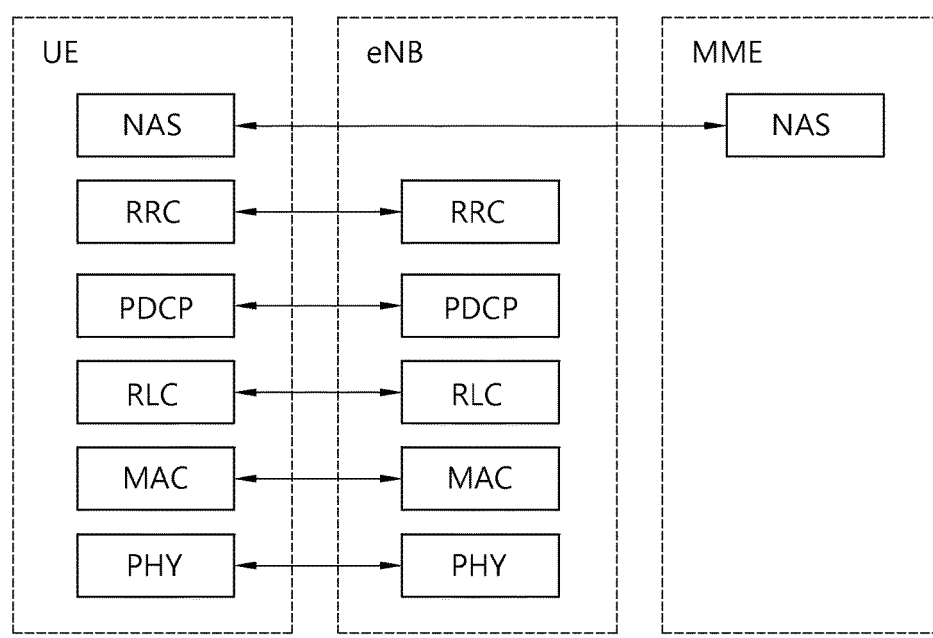
FIG. 4 shows a block diagram of a control plane protocol stack of an LTE system.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e., between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or IPv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Figure 5:
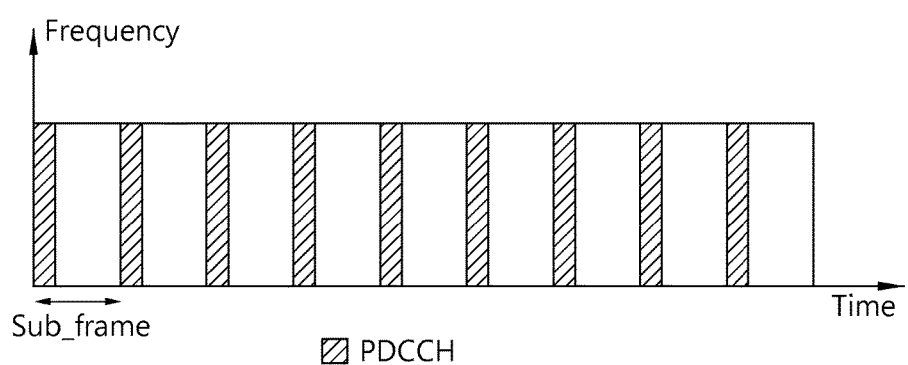
FIG. 5 shows an example of a physical channel structure.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, an uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Overall architecture and network interface for dual connectivity (DC) is described. It may be referred to 3GPP TR 36.842 V12.0.0 (2013-12). The E-UTRAN may support dual connectivity operation whereby a multiple RX/TX UE in RRC_CONNECTED is configured to utilize radio resources provided by two distinct schedulers, located in two eNBs connected via a non-ideal backhaul over the X2 interface. The overall E-UTRAN architecture described in FIG. 1 is applicable for dual connectivity as well. Two different roles may be assumed to eNBs involved in dual connectivity for a certain UE: an eNB may either act as a master eNB (MeNB) or as a secondary eNB (SeNB). The MeNB is the eNB which terminates at least S1-MME in dual connectivity. The SeNB is the eNB that is providing additional radio resources for the UE but is not the MeNB in dual connectivity. In dual connectivity a UE is connected to one MeNB and one SeNB.

Figure 6:
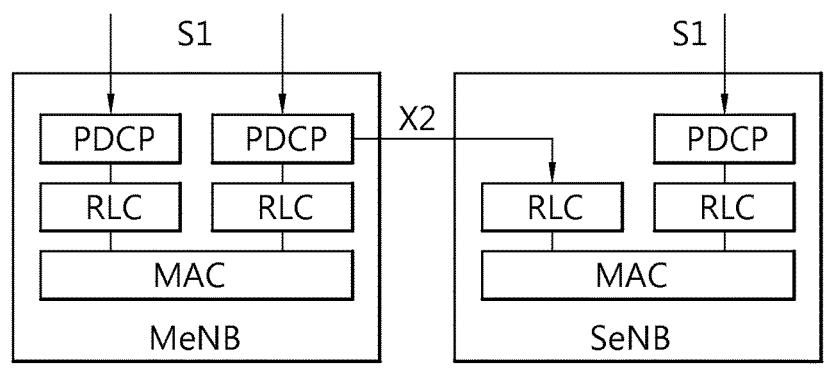
FIG. 6 shows radio protocol architecture for dual connectivity.

FIG. 6 shows radio protocol architecture for dual connectivity. In DC, the radio protocol architecture that a particular bearer uses depends on how the bearer is setup. Three alternatives exist, master cell group (MCG) bearer, secondary cell group (SCG) bearer and split bearer. Referring to FIG. 6, those three alternatives are depicted, i.e. in order of the MCG bearer, split bearer and SCG bearer from left to right. The MCG bearer is a bearer whose radio protocols are only located in the MeNB to use MeNB resources only in dual connectivity. The SCG bearer is a bearer whose radio protocols are only located in the SeNB to use SeNB resources in dual connectivity. The split bearer is a bearer whose radio protocols are located in both the MeNB and the SeNB to use both MeNB and SeNB resources in dual connectivity. Signaling radio bearers (SRBs) are always of the MCG bearer and therefore only use the radio resources provided by the MeNB. The MCG is a group of serving cells associated with the MeNB, comprising of the primary cell (PCell) and optionally one or more secondary cells (SCells) in dual connectivity. The SCG is a group of serving cells associated with the SeNB, comprising of primary SCell (PSCell) and optionally one or more SCells in dual connectivity. DC may also be described as having at least one bearer configured to use radio resources provided by the SeNB.

Figure 7:
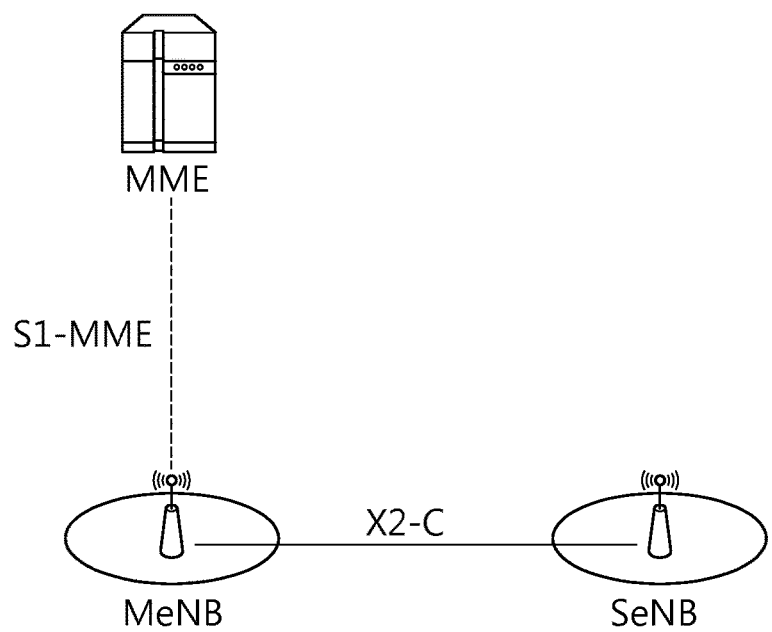
FIG. 7 shows C-plane connectivity of eNBs involved in dual connectivity for a certain UE.

FIG. 7 shows C-plane connectivity of eNBs involved in dual connectivity for a certain UE. Inter-eNB control plane signaling for dual connectivity is performed by means of X2 interface signaling. Control plane signaling towards the MME is performed by means of S1 interface signaling. There is only one S1-MME connection per UE between the MeNB and the MME. Each eNB should be able to handle UEs independently, i.e. provide the PCell to some UEs while providing SCell(s) for SCG to others. Each eNB involved in dual connectivity for a certain UE owns its radio resources and is primarily responsible for allocating radio resources of its cells, respective coordination between MeNB and SeNB is performed by means of X2 interface signaling. Referring to FIG. 7, the MeNB is C-plane connected to the MME via S1-MME, the MeNB and the SeNB are interconnected via X2-C.

Figure 8:
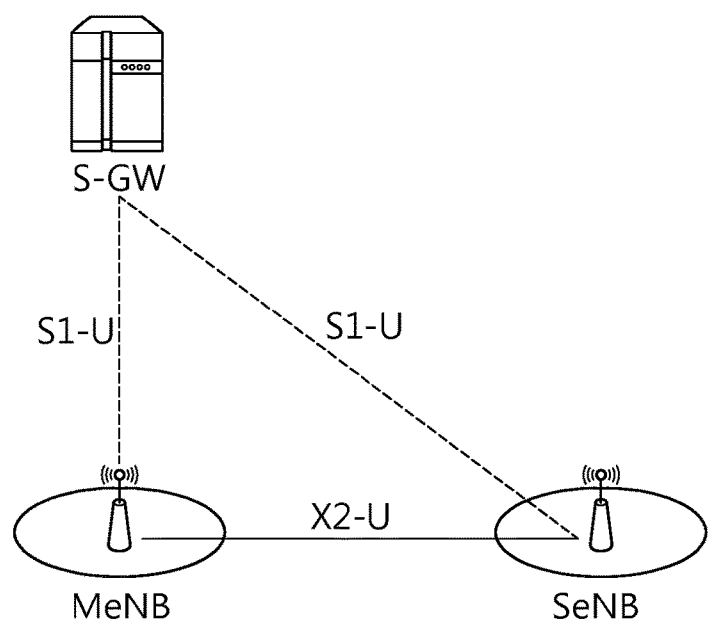
FIG. 8 shows U-plane connectivity of eNBs involved in dual connectivity for a certain UE.

FIG. 8 shows U-plane connectivity of eNBs involved in dual connectivity for a certain UE. U-plane connectivity depends on the bearer option configured. For MCG bearers, the MeNB is U-plane connected to the S-GW via S1-U, the SeNB is not involved in the transport of user plane data. For split bearers, the MeNB is U-plane connected to the S-GW via S1-U and in addition, the MeNB and the SeNB are interconnected via X2-U. For SCG bearers, the SeNB is directly connected with the S-GW via S1-U. If only MCG and split bearers are configured, there is no S1-U termination in the SeNB.

Figure 9:
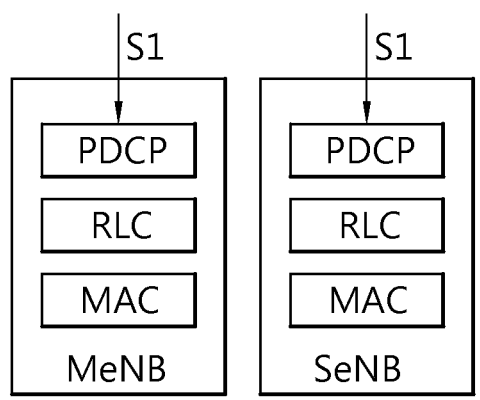
FIG. 9 shows an example of U-plane architecture for dual connectivity.

FIG. 9 shows an example of U-plane architecture for dual connectivity. U-plane architecture for dual connectivity shown in FIG. 9 is the combination of S1-U that terminates in SeNB and independent PDCPs (no bearer split).

Figure 10:
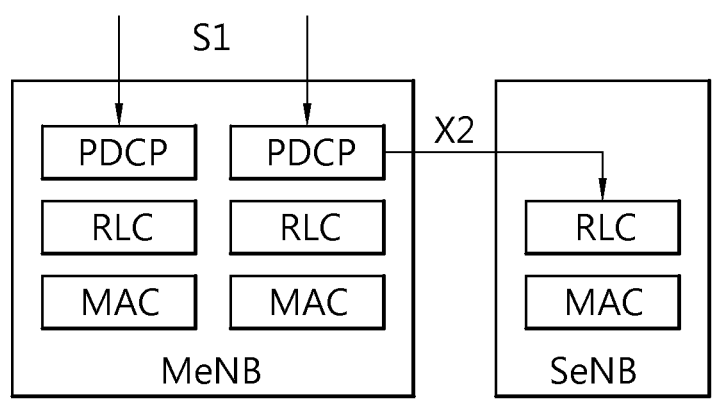
FIG. 10 shows another example of U-plane architecture for dual connectivity.

FIG. 10 shows another example of U-plane architecture for dual connectivity. U-plane architecture for dual connectivity shown in FIG. 10 is the combination of S1-U that terminates in MeNB, bearer split in MeNB, and independent RLCs for split bearers.

The corresponding UE architecture may be also changed to support the new feature.

Figure 11:
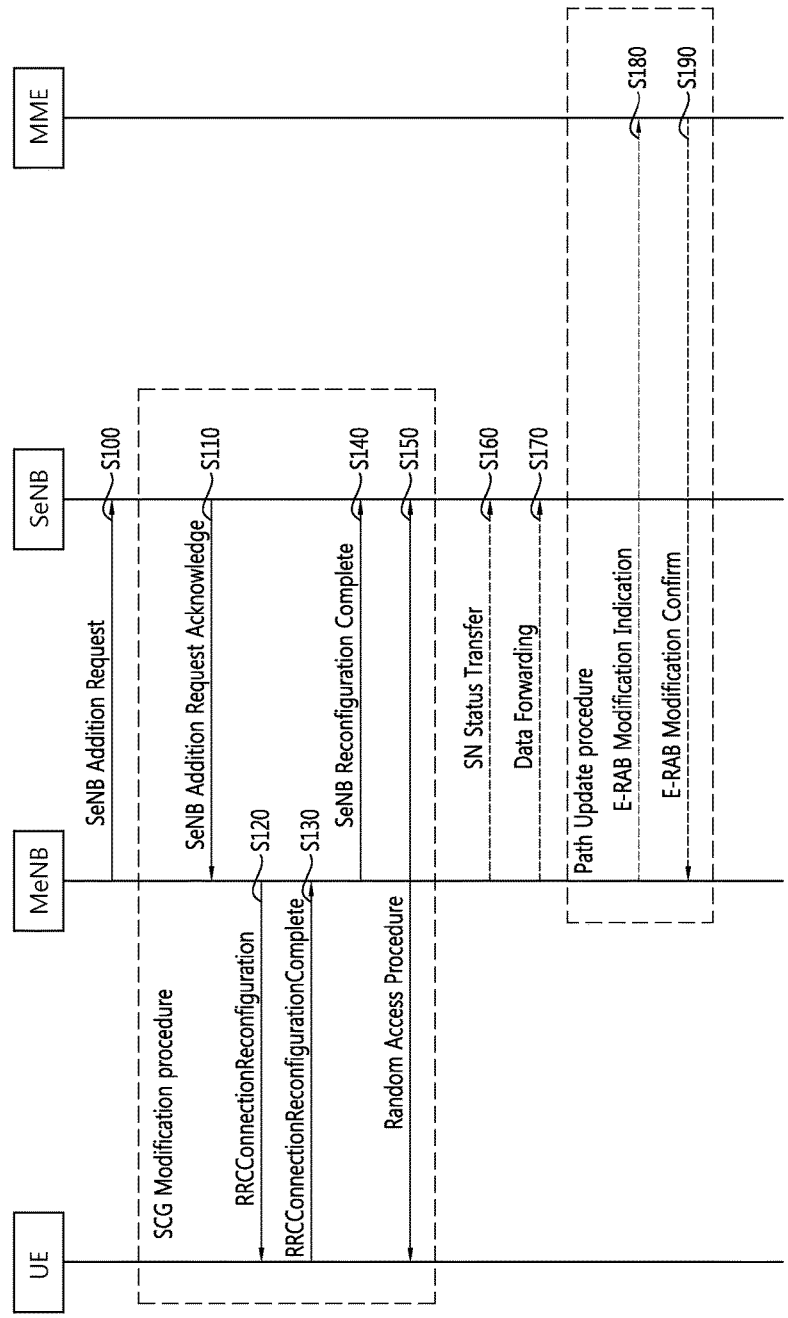
FIG. 11 shows a SeNB addition procedure for DC enhancement.

FIG. 11 shows a SeNB addition procedure for DC enhancement. The SeNB addition procedure is initiated by the MeNB and is used to establish a UE context at the SeNB in order to provide radio resources from the SeNB to the UE. This procedure is used to add at least the first cell (PSCell) of the SCG.

In step S100, the MeNB decides to request the SeNB to allocate radio resources for a specific E-UTRAN radio access bearer (E-RAB), indicating E-RAB characteristics (E-RAB parameters, transport layer network (TNL) address information corresponding to the UP option), by transmitting the SeNB Addition Request message to the SeNB. In addition, the MeNB indicates within SCG-ConfigInfo the MCG configuration (including security algorithm for SCG bearer) and the entire UE capabilities for UE capability coordination to be used as basis for the reconfiguration by the SeNB, but does not include SCG configuration. The MeNB can provide the latest measurement results for the SCG cell(s) requested to be added. The SeNB may reject the request. In contrast to SCG bearer, for the split bearer option, the MeNB may either decide to request resources from the SeNB of such an amount, that the quality of service (QoS) for the respective E-RAB is guaranteed by the exact sum of resources provided by the MeNB and the SeNB together, or even more. The MeNBs decision may be reflected in step S110 to be described below by the E-RAB parameters signaled to the SeNB, which may differ from E-RAB parameters received over S1. The MeNB may request the direct establishment of SCG or split bearer, i.e., without via MCG bearer.

If the radio resource management (RRM) entity in the SeNB is able to admit the resource request, the SeNB allocates respective radio resources and, dependent on the bearer option, respective transport network resources. The SeNB triggers random access so that synchronization of the SeNB radio resource configuration can be performed. In step S110, the SeNB provides the new radio resource of SCG in SCG-Config to the MeNB, by transmitting the SeNB Addition Request Acknowledge message to the MeNB. For SCG bearers, together with S1 DL transport network layer (TNL) address information for the respective E-RAB and security algorithm, for split bearers X2 DL TNL address information. In case of split bearers, transmission of user plane data may take place after step S110. In case of SCG bearers, data forwarding and the sequence number (SN) status transfer may take place after step S110.

If the MeNB endorses the new configuration, in step S120, the MeNB sends the RRCConnectionReconfiguration message to the UE including the new radio resource configuration of SCG according to the SCG-Config.

In step S130, the UE applies the new configuration, and replies with RRCConnectionReconfigurationComplete message. In case the UE is unable to comply with (part of) the configuration included in the RRCConnectionReconfiguration message, the UE performs the reconfiguration failure procedure.

In step S140, the MeNB informs the SeNB that the UE has completed the reconfiguration procedure successfully, by transmitting the SeNB Reconfiguration Complete message to the SeNB.

In step S150, the UE performs random access (RA) procedure towards the PSCell of the SeNB. The order the UE sends the RRCConnectionReconfigurationComplete message and performs the RA procedure towards the SCG is not defined. The successful RA procedure towards the SCG is not required for a successful completion of the RRC connection reconfiguration procedure.

In case SCG bearers, and dependent on the bearer characteristics of the respective E-RAB, the MeNB may take actions to minimize service interruption due to activation of dual connectivity. That is, in step S160, the MeNB may transmit the SN status transfer message to the SeNB. In step S170, the MeNB may perform data forwarding towards the SeNB.

Afterwards, for SCG bearers, the path update procedure towards the EPC is performed. During the path update procedure, the E-RAB modification indication procedure is performed. The purpose of the E-RAB modification indication procedure is to enable the eNB to request modifications of already established E-RABs for a given UE. The procedure uses UE-associated signaling. Specifically, in step S180, the MeNB may transmit the E-RAB Modification Indication message to the MME, in order to request the MME to apply the indicated modification for one or several E-RABs. In step S190, the MME may transmit the E-RAB Modification Confirmation message to the MeNB.

Table 1 shows an example of the E-RAB Modification Indication message. This message is sent by the eNB and is used to request the MME to apply the indicated modification for one or several E-RABs.

TABLE 1

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | reject |
| eNB UE S1AP ID | M | | 9.2.3.4 | | YES | reject |
| E-RAB to be Modified List | | 1 | | | YES | reject |
| >E-RAB to Be Modified Item IEs | | 1 ... <maxnoof E-RABs> | | | EACH | reject |
| >>E-RAB ID | M | | 9.2.1.2 | | — | |
| >>Transport Layer Address | M | | 9.2.2.1 | | — | |
| >>DL GTP TEID | M | | GTP-TEID 9.2.2.2 | | — | |
| E-RAB not to be Modified List | | 0 ... 1 | | | YES | reject |
| >E-RAB not to Be Modified Item IEs | | 1 ... <maxnoof E-RABs> | | | EACH | reject |
| >>E-RAB ID | M | | 9.2.1.2 | | — | |
| >>Transport Layer Address | M | | 9.2.2.1 | | — | |
| >>DL GTP TEID | M | | GTP-TEID 9.2.2.2 | | — | |

Table 2 shows an example of the E-RAB Modification Confirmation message. This message is sent by the MME and is used to report the outcome of the request from the E-RAB Modification Indication message.

TABLE 2

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | ignore |
| eNB UE S1AP ID | M | | 9.2.3.4 | | YES | ignore |
| E-RAB Modify List | | 0 ... 1 | | | YES | ignore |
| >E-RAB Modify Item IEs | | 1 ... <maxnoof E-RABs> | | | EACH | ignore |
| >>E-RAB ID | M | | 9.2.1.2 | | — | |
| E-RAB Failed to Modify List | O | | E-RAB List 9.2.1.36 | A value for E-RAB ID shall only be present once in E-RAB Modify List IE + E-RAB Failed to Modify List IE. | YES | ignore |
| Criticality Diagnostics | O | | 9.2.1.21 | | YES | ignore |

Referring to Table 1, the E-RAB Modification Indication message includes both the E-RAB to be Modified List information element (IE), which indicates a list of E-RABs to be modified, and the E-RAB not to be Modified List IE, which indicates a list of E-RABs not to be modified. However, in certain situations, it is possible that the MeNB includes the same E-RAB IDs twice or more. Currently, there is not solution yet, since only the E-RAB Modification Confirm message may be triggered.

In order to solve the problem described above, which can occur in some abnormal situations, a method for handling duplicated E-RABs reporting for dual connectivity according to an embodiment of the present invention may be proposed. According to an embodiment of the present invention, if the E-RAB Modification Indication message contains several E-RAB ID IEs set to the same value, the MME may trigger the UE context release procedure.

Figure 12:
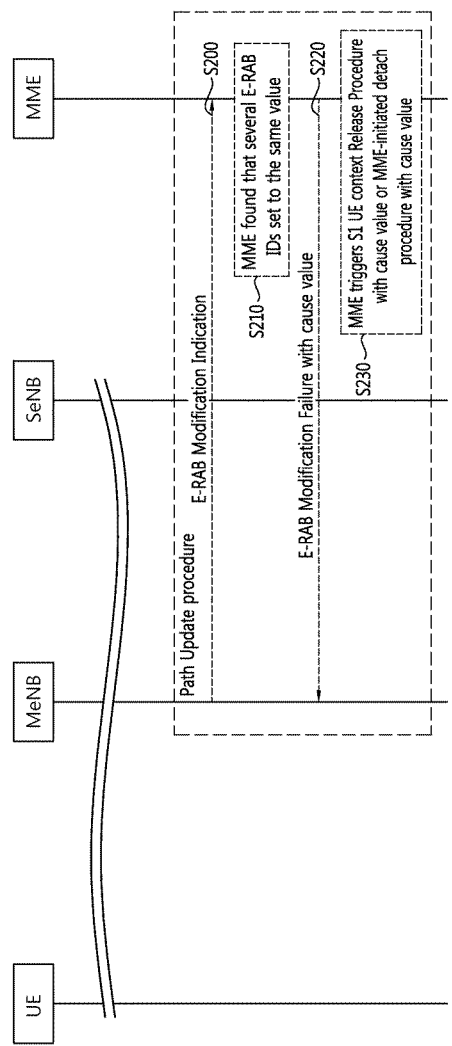
FIG. 12 shows an example of a method for handling duplicated E-RABs for dual connectivity according to an embodiment of the present invention.

FIG. 12 shows an example of a method for handling duplicated E-RABs for dual connectivity according to an embodiment of the present invention. It is assumed that the SeNB addition procedure corresponding to steps S100 to S170 shown in FIG. 11 are already performed. That is, FIG. 12 only shows the path update procedure according to an embodiment of the present invention, which replaces steps S180 and S190 shown in FIG. 11.

In step S200, the MeNB transmits the E-RAB Modification Indication message to the MME to request the MME to apply the indicated modification for one or several E-RABs. The E-RAB Modification Indication message includes both the E-RAB to be Modified List IE and the E-RAB not to be Modified List IE.

In step S210, the MME identifies whether several E-RAB IDs are set to the same value or not in the E-RAB Modification Indication message.

If it is identified that several E-RAB IDs are set to the same value in the E-RAB Modification Indication message, in step S220, the MME transmits the E-RAB Modification Failure message to the MeNB. The E-RAB Modification Failure message may include a cause value or an independent IE, which indicates the reason of failure, here which means that the MeNB set several E-RAB IDs to the same value. Also, the E-RAB Modification Failure message may also indicate to the MeNB to release the UE context (For the MeNB to initiate).

In step S230, the MME triggers the S1 UE context release procedure with a cause value, and then the UE may transit to idle mode. Triggering the S1 UE context release procedure with the cause value may include transmitting a UE context release command message including the cause value to the MeNB. Or, the MME may trigger the MME-initiated detach procedure with cause value, then the UE may be detached.

Figure 13:
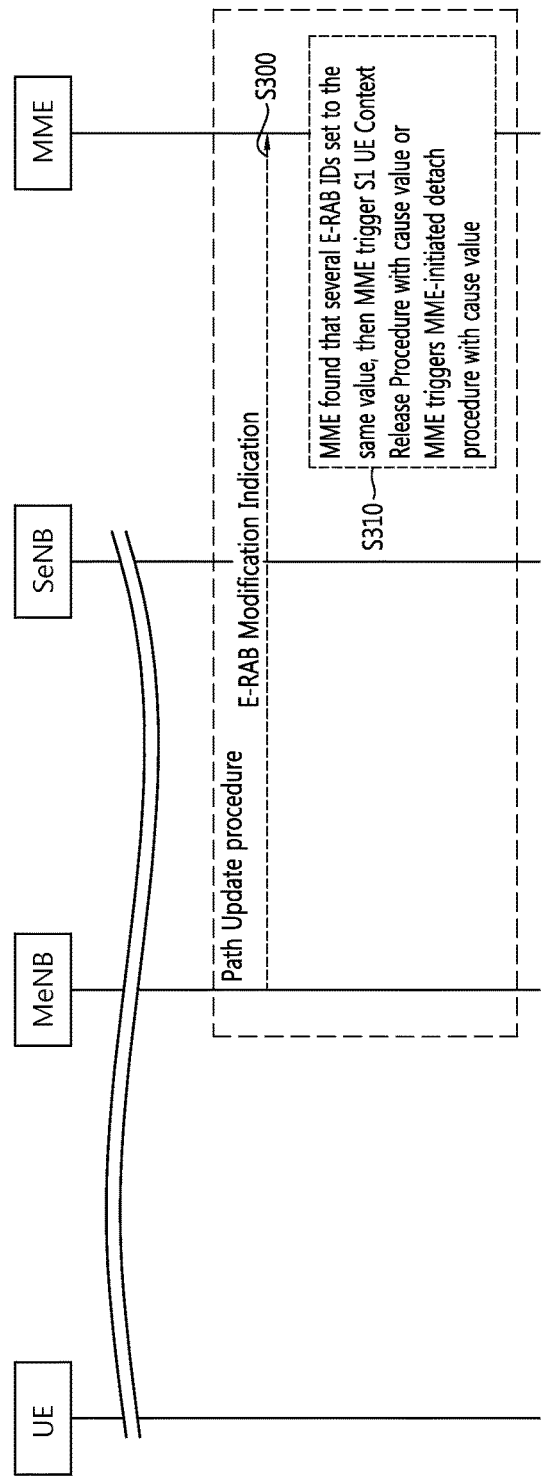
FIG. 13 shows another example of a method for handling duplicated E-RABs for dual connectivity according to an embodiment of the present invention.

FIG. 13 shows another example of a method for handling duplicated E-RABs for dual connectivity according to an embodiment of the present invention. It is assumed that the SeNB addition procedure corresponding to steps S100 to S170 shown in FIG. 11 are already performed. That is, FIG. 13 only shows the path update procedure according to an embodiment of the present invention, which replaces steps S180 and S190 shown in FIG. 11.

In step S300, the MeNB transmits the E-RAB Modification Indication message to the MME to request the MME to apply the indicated modification for one or several E-RABs. The E-RAB Modification Indication message includes both the E-RAB to be Modified List IE and the E-RAB not to be Modified List IE.

In step S310, the MME identifies whether several E-RAB IDs are set to the same value or not in the E-RAB Modification Indication message. Then, the MME triggers the S1 UE context release procedure directly with cause value, and then UE may transit to idle mode. Triggering the S1 UE context release procedure with the cause value may include transmitting a UE context release command message including the cause value to the MeNB. Or, the MME may trigger the MME-initiated detach procedure with cause value, and then the UE may be detached.

Figure 14:
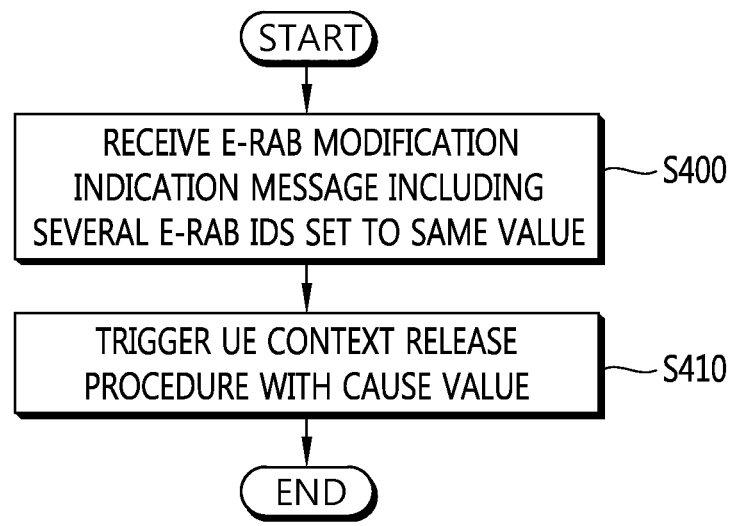
FIG. 14 shows another example of a method for handling duplicated E-RABs for dual connectivity according to an embodiment of the present invention.

FIG. 14 shows another example of a method for handling duplicated E-RABs for dual connectivity according to an embodiment of the present invention.

In step S400, the MME receives an E-RAB modification indication message including several E-RAB IDs set to the same value. The E-RAB modification indication message may be received from a MeNB in dual connectivity, in which a UE is connected to both the MeNB and a SeNB. The E-RAB modification indication message may include both a list of E-RABs to be modified and a list of E-RABs not to be modified. The E-RAB modification indication message may request the MME to apply modification of at least one E-RAB.

Upon receiving the E-RAB modification indication message, the MME may identify whether the several E-RAB IDs are set to the same value or not. In step S410, the MME triggers a UE context release procedure. Accordingly, if the E-RAB Modification Indication message contains several E-RAB IDs set to the same value, the MME may trigger the UE context release procedure with a cause value. Triggering the UE context release procedure with the cause value may include transmitting a UE context release command message including the cause value to a MeNB. The MME may further trigger a MME-initiated detach procedure. The MME may further transmit an E-RAB modification failure message to the MeNB. The E-RAB modification failure message may include a cause value or IE which indicates reason of E-RAB modification failure. The E-RAB modification failure message may indicate to the MeNB to release UE context.

Figure 15:
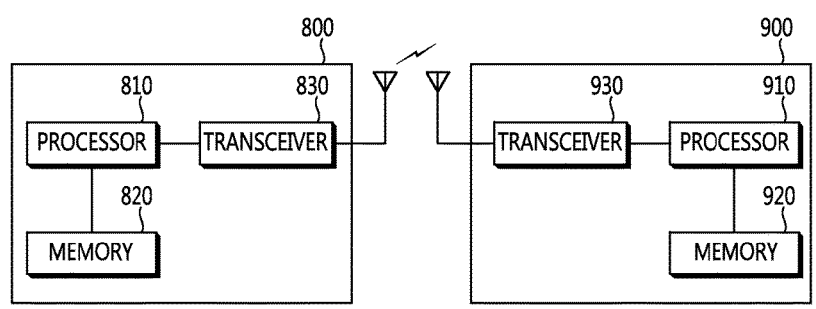
FIG. 15 shows a wireless communication system to implement an embodiment of the present invention.

FIG. 15 shows a wireless communication system to implement an embodiment of the present invention.

A MME 800 includes a processor 810, a memory 820, and a transceiver 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A MeNB in dual connectivity 900 includes a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

According to an embodiment of the present invention, an abnormal case in which several E-RAB IDs are set to the same value in the E-RAB Modification Indication message can be handled efficiently.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for handling, by a mobility management entity (MME), duplicated evolved universal terrestrial radio access network (E-UTRAN) radio access bearers (E-RABs) for dual connectivity in a wireless communication system, the method comprising:
   receiving an E-RAB modification indication message including several E-RAB identifiers (IDs) set to the same value; and
   triggering a user equipment (UE) context release procedure with a cause value.

2. The method of claim 1, wherein the E-RAB modification indication message is received from a master evolved NodeB (MeNB) in dual connectivity.

3. The method of claim 2, wherein a UE is connected to both the MeNB and a secondary eNB (SeNB) in the dual connectivity.

4. The method of claim 1, wherein the E-RAB modification indication message includes both a list of E-RABs to be modified and a list of E-RABs not to be modified.

5. The method of claim 1, wherein the E-RAB modification indication message requests the MME to apply modification of at least one E-RAB.

6. The method of claim 1, further comprising identifying whether the several E-RAB IDs are set to the same value or not, upon receiving the E-RAB modification indication message.

7. The method of claim 1, wherein triggering the UE context release procedure with the cause value comprises transmitting a UE context release command message including the cause value to a MeNB.

8. The method of claim 1, further comprising triggering a MME-initiated detach procedure.

9. The method of claim 1, further comprising transmitting an E-RAB modification failure message to a MeNB.

10. The method of claim 9, wherein the E-RAB modification failure message includes a cause value or information element (IE) which indicates reason of E-RAB modification failure.

11. The method of claim 9, wherein the E-RAB modification failure message indicates to the MeNB to release UE context.

12. A mobility management entity (MME) comprising:
   a memory;
   a transceiver; and
   a processor coupled to the memory and the transceiver, and configured to:
      control the transceiver to receive an evolved universal terrestrial radio access network (E-UTRAN) radio access bearer (E-RAB) modification indication message including several E-RAB identifiers (IDs) set to the same value; and
      trigger a user equipment (UE) context release procedure with a cause value.

13. The MME of claim 12, wherein the E-RAB modification indication message is received from a master evolved NodeB (MeNB) in dual connectivity.

14. The MME of claim 13, wherein a UE is connected to both the MeNB and a secondary eNB (SeNB) in the dual connectivity.

15. The MME of claim 12, wherein the E-RAB modification indication message includes both a list of E-RABs to be modified and a list of E-RABs not to be modified.

* * * * *